(12) United States Patent
Au et al.

(10) Patent No.: US 10,728,743 B2
(45) Date of Patent: Jul. 28, 2020

(54) SYSTEM AND METHOD OF AIR INTERFACE CAPABILITY EXCHANGE

(71) Applicants: Kelvin Kar Kin Au, Kanata (CA); Jianglei Ma, Ottawa (CA)

(72) Inventors: Kelvin Kar Kin Au, Kanata (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/000,611

(22) Filed: Jan. 19, 2016

(65) Prior Publication Data

US 2017/0208455 A1 Jul. 20, 2017

(51) Int. Cl.
| | | |
|---|---|---|
| *H04W 8/24* | (2009.01) | |
| *H04W 8/22* | (2009.01) | |
| *H04W 76/10* | (2018.01) | |
| *H04L 1/00* | (2006.01) | |
| *H04B 1/00* | (2006.01) | |

(Continued)

(52) U.S. Cl.
CPC ............... *H04W 8/24* (2013.01); *H04L 1/00* (2013.01); *H04W 8/22* (2013.01); *H04W 8/245* (2013.01); *H04W 76/10* (2018.02); *H04B 1/0003* (2013.01); *H04L 5/0007* (2013.01); *H04W 88/06* (2013.01)

(58) Field of Classification Search
CPC ................................ H04W 8/24; H04W 76/02
See application file for complete search history.

(56) References Cited

U.S. PATENT DOCUMENTS

| 5,412,375 A | 5/1995 | Wood | |
|---|---|---|---|
| 2002/0196760 A1* | 12/2002 | Malomsoky | H04Q 7/24 |

(Continued)

FOREIGN PATENT DOCUMENTS

| CN | 101159975 A | 4/2008 |
|---|---|---|
| CN | 101686510 A | 3/2010 |

(Continued)

OTHER PUBLICATIONS

3GPP TS 36.331 V12.6.0 (Jun. 2015) 3rd Generation Partnership Project; Technical Specification Group Radio Access Network; Evolved Universal Terrestrial Radio Access (E-UTRA); Radio Resource Control (RRC); Protocol specification (Release 12), (Jun. 2015) pp. 1-449, France.

(Continued)

*Primary Examiner* — Ronald B Abelson

(57) ABSTRACT

Methods and Devices that provide mechanisms for an air interface capability exchange are disclosed. The air interface capability exchange enables a user equipment device to signal its air interface configuration capabilities to a network device to facilitate software configurable air interface (SoftAI) optimization. The air interface capability exchange involves a UE device signaling information regarding an air interface configuration capability type of the device's air interface. The air interface configuration capability type identifies whether the device supports multiple air interface configurations of the air interface. The UE device may also transmit information regarding air interface configuration options that it supports. The network device may determine a configuration for the UE device's air interface based at least in part on the information provided by the UE device.

33 Claims, 7 Drawing Sheets

(51) Int. Cl.
*H04L 5/00* (2006.01)
*H04W 88/06* (2009.01)

(56) References Cited

U.S. PATENT DOCUMENTS

| | | | |
|---|---|---|---|
| 2004/0076130 A1* | 4/2004 | Uchida | H04W 48/18 370/335 |
| 2006/0227736 A1* | 10/2006 | Conyers | H04Q 7/00 |
| 2007/0101120 A1* | 5/2007 | Patel | H04L 9/00 |
| 2007/0160071 A1 | 7/2007 | Overtoom et al. | |
| 2007/0255797 A1 | 11/2007 | Dunn et al. | |
| 2012/0182121 A1 | 7/2012 | Mueck | |
| 2013/0173765 A1* | 7/2013 | Korbecki | G06F 15/177 |
| 2014/0016570 A1* | 1/2014 | Ma | H04W 48/18 370/329 |
| 2014/0329557 A1 | 11/2014 | Van Der Velde et al. | |
| 2015/0055572 A1 | 2/2015 | Ishikura et al. | |
| 2016/0381550 A1 | 12/2016 | Fodor et al. | |
| 2017/0127435 A1* | 5/2017 | Rong | H04W 72/1215 |

FOREIGN PATENT DOCUMENTS

| | | |
|---|---|---|
| CN | 102792720 A | 11/2012 |
| JP | 2013197820 A | 9/2013 |
| WO | WO2014008853 A1 | 1/2014 |

OTHER PUBLICATIONS

3GPP TS 36.306 V12.5.0 (Jun. 2015) 3rd Generation Partnership Project; Technical Specification Group Radio Access Network; Evolved Universal Terrestrial Radio Access (E-UTRA); User Equipment (UE) radio access capabilities (Release 12), (Jun. 2015) pp. 1-44, France.

Chen, Yami, et al. No More Cell Access/Soft Defined Air Interface-5G System Architecture Solution Research, Telecommunications Network Technology No. 5, May 15, 2015, pp. 35-42.

Qi, Sun, et al. Software Defined Air Interface: A Framework of 5G Air Interface, IEEE Wireless Communications and Networking Conference (WCNC) 5G Workshop., Dec. 31, 2015, pp. 1-6.

XP051043612 RWS-150006 Huawei Technologies, "Vision on 5G Radio Access Technologies",3GPP RAN workshop on 5G Sep. 17-18, 2015 Phoenix, USA,total 18 pages.

XP051047620 3GPP TS 36.306 V13.0.0, 3rd Generation Partnership Project;Technical Specification Group Radio Access Network;Evolved Universal Terrestrial Radio Access (E-UTRA);User Equipment (UE) radio access capabilities (Release 13), Dec. 2015, 48 pages.

XP055248882 ICT-317669-METIS/D2. 1 Mobile and wireless communications Enablers for the Twenty-twenty Information Society (METIS)Deliverable D2.1,Requirement analysis uP design approaches for 5G air interface,dated Aug. 30, 2013,total 72 pages.

3GPP TSG-SA#67 SP-150105, Document 5D/TEMP/577, Radiocommunication Study Groups, International Telecommunication Union 21st Meeting of Working Party 5D Auckland, New Zealand, Jan. 27-Feb. 4, 2015, total 3 pages.

3GPP Workshop on Release 12 and onwards, RWS-120010, NTT DOCOMO, Inc., Requirements, Candidate Solutions and Technology Roadmap for LTE Rel-12 Onward, Ljubljana, Slovenia, Jun. 11-12, 2012. total 27 pages.

* cited by examiner

SYSTEM AND METHOD OF AIR INTERFACE CAPABILITY EXCHANGE

FIELD OF THE APPLICATION

The present invention relates to wireless communication generally, and, in particular embodiments, to a system and method for air interface capability exchange.

BACKGROUND

An air interface is the wireless communications link between two or more communicating devices, such as an evolved NodeB (also commonly referred to as a NodeB, a base station, a transmit point, a remote radio head, a communications controller, a controller, and the like) and a user equipment (UE) (also commonly referred to as a mobile station, a subscriber, a user, a terminal, a phone, and the like). Typically, both communicating devices need to know the air interface in order to successfully transmit and receive a transmission.

In many current wireless networks, the air interface definition is a one-size-fits-all concept. The components within the air interface cannot be changed or adapted once the air interface is defined.

A software configurable air interface (SoftAI) concept has been proposed to provide a framework for a flexible air interface for 5G networks. It is intended to provide adaptation of different components within the air interface, and to address the potential requirements of future applications.

SUMMARY

One broad aspect of the present invention provides a method for a device that supports an air interface to advise another device, such as a network device, of its air interface capabilities. The method includes transmitting information regarding an air interface configuration capability type of the device. The air interface configuration capability type identifies whether the device supports multiple air interface configurations of the air interface.

In some embodiments, there may be multiple air interface configuration capability types, with each air interface configuration capability type corresponding to support for a different level of configurability of the air interface. For example, the air interface configuration capability types may include a first air interface configuration capability type corresponding to support for only a predefined air interface configuration of the air interface. In some cases, the method may further include transmitting information regarding the predefined air interface configuration supported by the device. In one embodiment, the first air interface configuration type is associated with a specific predefined air interface configuration, and therefore the information identifying the device as being of the first air interface configuration capability type may indicate that the device supports the specific predefined air interface configuration.

In some embodiments, the air interface configuration capability types further include a second air interface configuration capability type corresponding to support for multiple air interface configuration options of the air interface.

In some cases, the second air interface configuration capability type may correspond to support for configurability of only a subset of predefined air interface configuration options of the air interface, and the air interface configuration capability types may further include a third air interface configuration capability type corresponding to support for configurability of all of the predefined air interface configuration options of the air interface.

In some embodiments, the method further includes transmitting information regarding predefined air interface configuration options supported by the device. In some implementations, the information regarding predefined air interface configuration options supported by the device includes at least one air interface profile indice, where each air interface profile indice corresponds to a predefined air interface configuration option.

The method may further include transmitting information regarding further air interface configuration options supported by the device. For example, the air interface may be characterized by a plurality of building blocks, and the information regarding further air interface configuration options supported by the device may include information regarding air interface capability options associated with the plurality of building blocks. In some cases, the information regarding air interface capability options associated with the plurality of building blocks includes air interface capability option indices, where each air interface capability option indice corresponds to a respective air interface capability option supported by the device.

In some embodiments, the method also includes receiving information regarding configuration of the air interface of the device. The configuration may have been determined based at least in part on the transmitted information regarding the air interface configuration capability type of the device. The device may then configure the air interface based on the received information. In some cases, the information regarding configuration of the air interface of the device includes an air interface profile indice corresponding to an air interface profile that includes a predefined air interface configuration option.

The information regarding the air interface configuration capability type of the device may be transmitted under various circumstances or in response to certain occurrences. For example, in some cases it may be transmitted in response to receiving an inquiry, and in other cases it may be transmitted as part of an initial network access procedure. In some cases, the information may be transmitted over a control channel, such as a radio resource control channel.

Another broad aspect of the present invention provides a device that includes a wireless interface that supports an air interface for the device, a processor operatively coupled to the wireless interface, and a computer readable storage medium operatively coupled to the processor. The computer readable storage medium may store programming for execution by the processor. The programming may include instructions to transmit, via the wireless interface, information regarding an air interface configuration capability type of the device. The air interface configuration capability type may identify whether the device supports multiple air interface configurations of the air interface.

In some embodiments, the air interface configuration capability type is one of multiple air interface configuration capability types, where each air interface configuration capability type corresponds to support for a different level of configurability of the air interface. The air interface configuration capability types may include one or more of the following air interface configuration capability types: a first air interface configuration capability type corresponding to support for only a predefined air interface configuration, a second air interface configuration capability type corresponding to support for multiple air interface configuration options, with configurability of only a subset of predefined air interface configurations of the air interface, and a third air interface configuration capability type corresponding to support for multiple air interface configuration options, with configurability of all of the predefined air interface configuration options of the air interface.

The programming may further include instructions to transmit, via the wireless interface, information regarding at least one predefined air interface configuration option supported by the device.

In some cases, the information regarding at least one predefined air interface configuration option supported by the device may include at least one air interface profile indice, where each air interface profile indice corresponds to a respective predefined air interface configuration option.

The programming may further include instructions to transmit, via the wireless interface, information regarding at least one further air interface configuration option supported by the device. For example, the air interface may be characterized by multiple building blocks, and the information regarding at least one further air interface configuration option supported by the device may include information regarding air interface capability options associated with the building blocks. In some cases, the information regarding air interface capability options associated with the building blocks may include air interface capability option indices, where each air interface capability option indice corresponds to a respective air interface capability option supported by the device.

In some embodiments, the programming further includes instructions to receive, via the wireless interface, information regarding configuration of the air interface of the device. The configuration may have been determined based at least in part on the transmitted information regarding the air interface configuration capability type of the device. The programming may also include instructions to configure the air interface of the device based on the received information. The information regarding configuration of the air interface of the device may include an air interface profile indice corresponding to an air interface profile that includes a predefined air interface configuration option.

In some cases, the instructions to transmit information regarding an air interface configuration capability type of the device may include instructions to transmit the information in response to receiving an inquiry and/or instructions to transmit the information as part of an initial network access procedure.

Another broad aspect of the present invention provides a method that includes receiving information regarding an air interface configuration capability type of a device that supports an air interface. The air interface configuration capability type may identify whether the device supports multiple air interface configurations of the air interface. The method may further include determining a configuration of the air interface of the device based at least in part on the information regarding the air interface configuration capability type of the device.

In some embodiments, there are multiple air interface configuration capability types, with each air interface configuration capability type corresponding to support for a different level of configurability of the air interface. The air interface configuration capability types may include a first air interface configuration capability type corresponding to support for only a predefined air interface configuration of the air interface.

In some cases, the first air interface configuration capability type may be associated with a specific predefined air interface configuration, and it may be determined that the device supports the specific predefined air interface configuration where the information regarding the air interface configuration capability type of the device indicates that the air interface configurability type is the first air interface configuration capability type.

In some embodiments, the method further includes receiving information regarding at least one predefined air interface configuration option supported by the device. In such cases, the configuration of the air interface of the device may be further based at least in part on the information regarding the at least one predefined air interface configuration option supported by the device. In some cases, the information regarding the at least one predefined air interface configuration option supported by the device includes at least one air interface profile indice, where each air interface profile indice corresponds to a respective predefined air interface configuration option supported by the device.

In some embodiments, the method further includes receiving information regarding at least one further air interface configuration option supported by the device. In such cases, the configuration of the air interface of the device may be further based at least in part on the information regarding the at least one further air interface configuration option supported by the device.

In some cases, the air interface of the device may be characterized by multiple building blocks. In such cases, the information regarding at least one further air interface configuration option supported by the device may include information regarding air interface capability options associated with the building blocks. For example, the information regarding air interface capability options associated with the building blocks may include air interface capability option indices, where each air interface capability option indice corresponds to a respective air interface capability option supported by the device.

In some cases, the information regarding the air interface configuration capability type of the device may be received by first transmitting an inquiry to the device and then receiving the information in a response to the inquiry. In other cases, the information regarding the air interface configuration capability type may be received as part of an initial network access procedure by the device.

In some embodiments, the method also includes transmitting information to the device regarding the configuration of the air interface of the device, where the configuration may have been determined as described above.

BRIEF DESCRIPTION OF THE DRAWINGS

Embodiments will now be described with reference to the attached drawings in which.

DETAILED DESCRIPTION OF EMBODIMENTS

The present disclosure will be described with respect to example embodiments in a specific context, namely a heterogeneous communications system with different transmission source types and/or different transmission destination types. The different transmission source types may have different transmission capabilities, while the different transmission destination types may have different reception capabilities.

Figure 1:
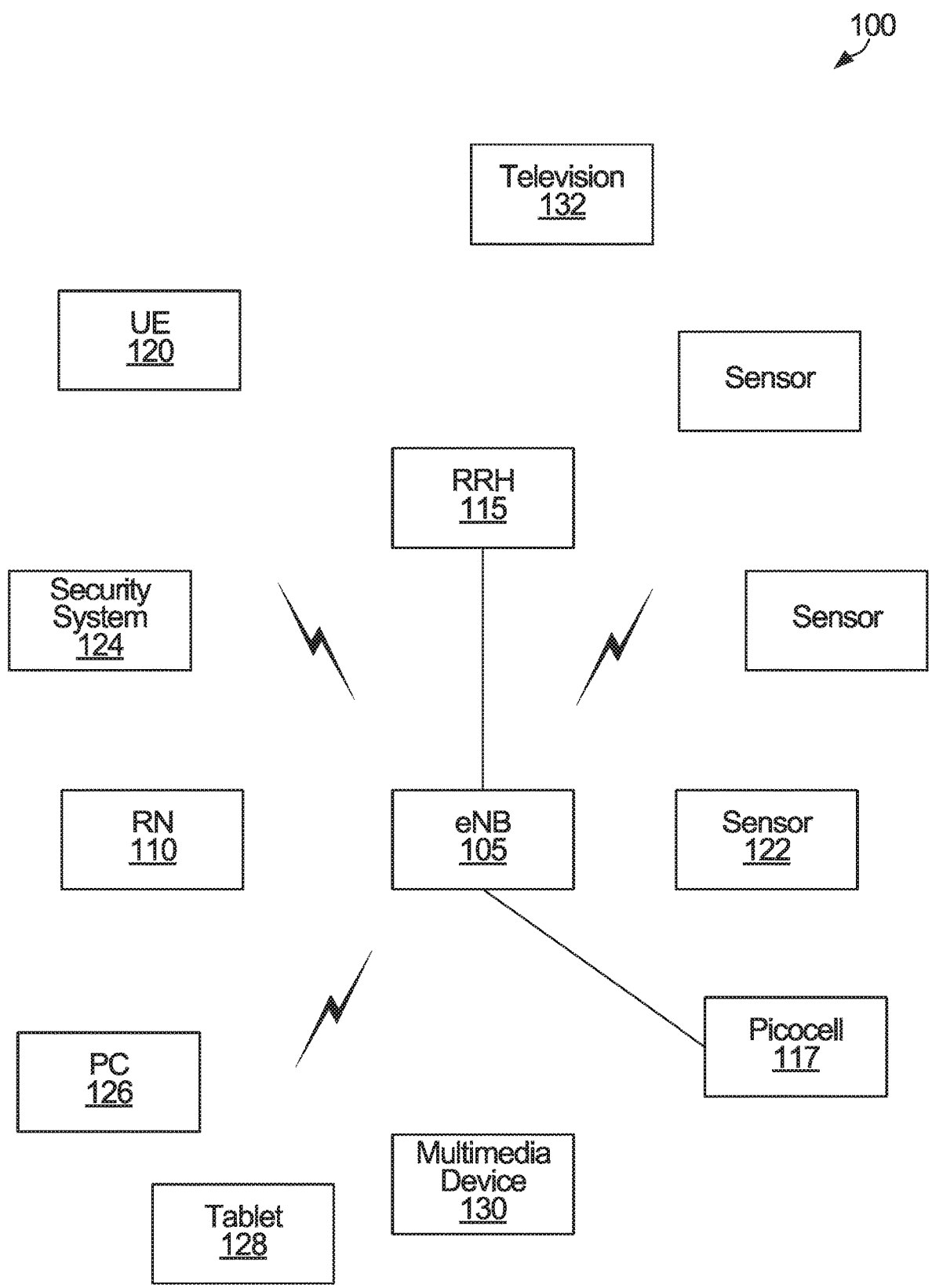
FIG. 1 illustrates an example heterogeneous communications system according to example embodiments described herein.

FIG. 1 illustrates a heterogeneous communications system 100. A heterogeneous communications system 100 may include a plurality of transmission sending devices, such as an evolved NodeB (eNB) 105, a relay node (RN) 110, a remote radio head (RRH) 115. Other non-limiting examples of transmission sending devices include network transmit points located in picocells (e.g., picocell 117), femtocells, low-power cells, full-power cells, and the like. It is noted that many transmission sending devices, especially network side transmission sending devices, may be coupled together via a backhaul, which may be wired or wireless. As an example, eNB 105 may be connected to RRH 115 and picocell 117 via backhauls. Heterogeneous communications system 100 may include a plurality of transmission receiving devices, such as a user equipment (UE) 120, a sensor 122, a security system 124, a personal computer (PC) 126, a tablet computer 128, a multimedia device 130, a television 132, and the like.

While it is understood that communications systems may employ multiple transmission sending devices capable of communicating with a number of transmission receiving devices, only a small number of transmission sending devices and transmission receiving devices are illustrated for simplicity.

A transmitting-receiving device may be used to refer to a transmission sending device and/or a transmission receiving device. It is noted that a single device may be both a transmission sending device and a transmission receiving devices at different times, in different configurations, and/or with different communications partners. A communications controller may be a device configured to regulate the communications occurring in communications system 100. Examples of communications controllers include eNBs, a switch coupled to and controlling the eNBs, as well as other controlling entities in communications system 100.

The different transmission sending devices may have different transmission capabilities and/or requirements. As an example, an eNB may have multiple transmit antenna, while a picocell may not have multiple transmit antenna or a relatively small number of transmit antennas. Additionally, a picocells may transmit at a lower maximum power level comparable to that of an eNB. Similarly, a PC may have much higher data bandwidth requirements and signal processing capability than a sensor, and a security system may have much stricter reliable message reception requirements than a television. Therefore, in a heterogeneous communications system, such as heterogeneous communications system 100, different pairs of communicating devices (i.e., a transmission sending device and a transmission receiving device) may have different transmission capabilities and/or transmission requirements. The different transmission capabilities and/or transmission requirements typically cannot be met optimally by a single air interface or air interface configuration.

Figure 2:
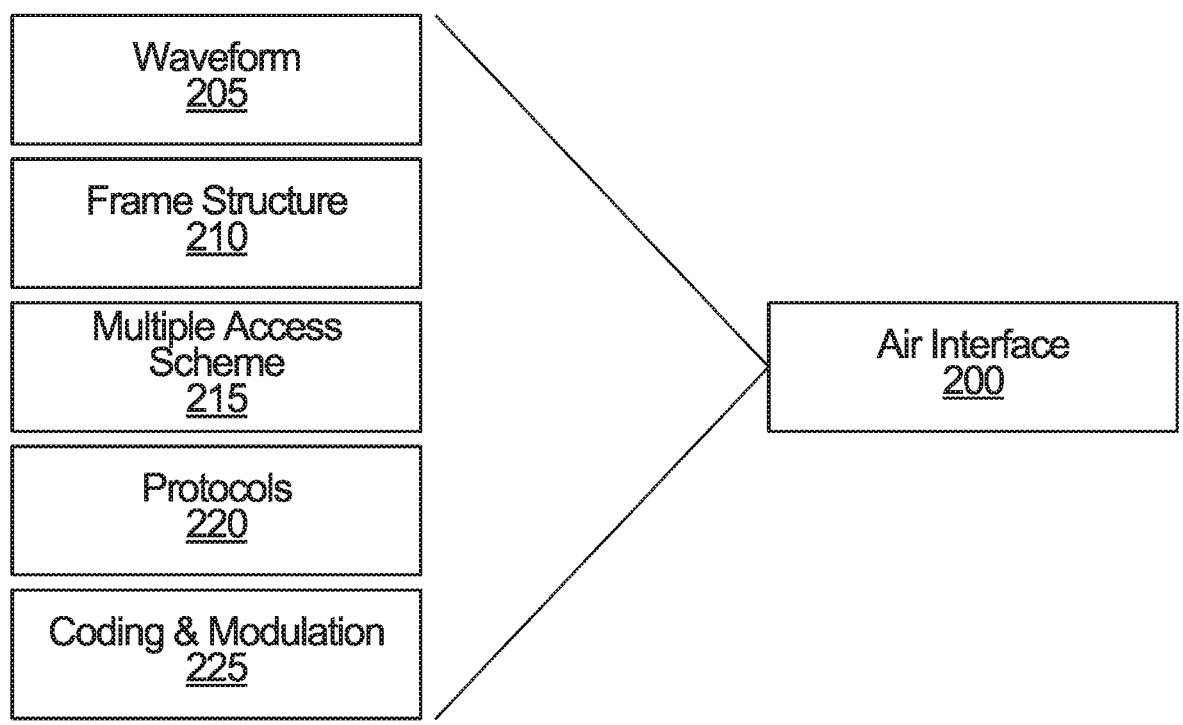
FIG. 2 illustrates an example air interface according to example embodiments described herein.

FIG. 2 illustrates a diagram of an air interface 200. Air interface 200 comprises a number of building blocks that collectively specify how a transmission is to be made and/or received. The building blocks of air interface 200 may include waveform building block 205, frame structure building block 210, multiple access scheme building block 215, a protocols building block 220, and a coding and modulation building block 225.

Waveform building block 205 may specify a shape and form of a signal being transmitted. Non-limiting examples of waveform options include Orthogonal Frequency Division Multiplexing (OFDM) based waveform such as filtered OFDM (f-OFDM), Low Density Signature Multicarrier Code Division Multiple Access (LDS-MC-CDMA), Wavelet Packet Modulation (WPM), Faster Than Nyquist (FTN) Waveform, low Peak to Average Ratio Waveform (low PAPR WF), Filter Bank Multicarrier (FBMC) Waveform, Single Carrier Frequency Division Multiple Access (SC-FDMA), Sparse Code Multiple Access (SCMA) and the like. For OFDM-based waveforms, the waveform building block may specify the associated waveform parameters such as sub-carrier spacings and cyclic prefix (CP) overhead.

Frame structure building block 210 may specify a configuration of a frame or group of frames. Non-limiting examples of frame structure options include a configurable multi-level transmission time interval (TTI), a fixed TTI, a configurable single-level TTI, a co-existence configuration, and the like. The lengths of a TTI may also be specified.

Multiple access scheme 215 may specify how access to a channel is granted for one or more users. Non-limiting examples of multiple access technique options include scheduled access, grant-free access, dedicated channel resource (no sharing between multiple users), contention based shared channel resource, non-contention based shared channel resource, cognitive radio based access, and the like.

Protocols building block 220 may specify how a transmission and/or a re-transmission are to be made. Non-limiting examples of transmission and/or re-transmission mechanism options include those that specify a scheduled data pipe size, a signaling mechanism for transmission and/or re-transmission, a re-transmission mechanism, and the like.

Coding and modulation building block 225 may specify how information being transmitted may be encoded (decoded) and modulated (demodulated) for transmission (reception) purposes. Non-limiting examples of coding and/or modulation technique options include turbo trellis codes, turbo product codes, fountain codes, hierarchical modulation, low PAPR modulation, polar codes, and the like.

Since an air interface comprises a plurality of building blocks, and each building block may have a plurality of candidate technologies (also referred to herein as air interface capability options), it may be possible to configure a large number of different air interface profiles, where each air interface profile defines a respective air interface configuration option. For example, each air interface configuration option may define a respective set of air interface capability options, with a respective interface capability option selected for each of the building blocks of the air interface. Each of the different air interface profiles may be targeted to meet a different set of transmission requirements, including transmission content, transmit condition, receive condition, and the like. In general, the transmission requirements specify the transmission. Then, according to transmission requirements of a pair of communicating transmitting-receiving devices (i.e., the transmission requirements for the transmission), one of the different air interface profiles that best meet the transmission requirements (and hence the transmission) may be selected and used for communications between the pair of communicating transmitting-receiving devices.

Figure 3:
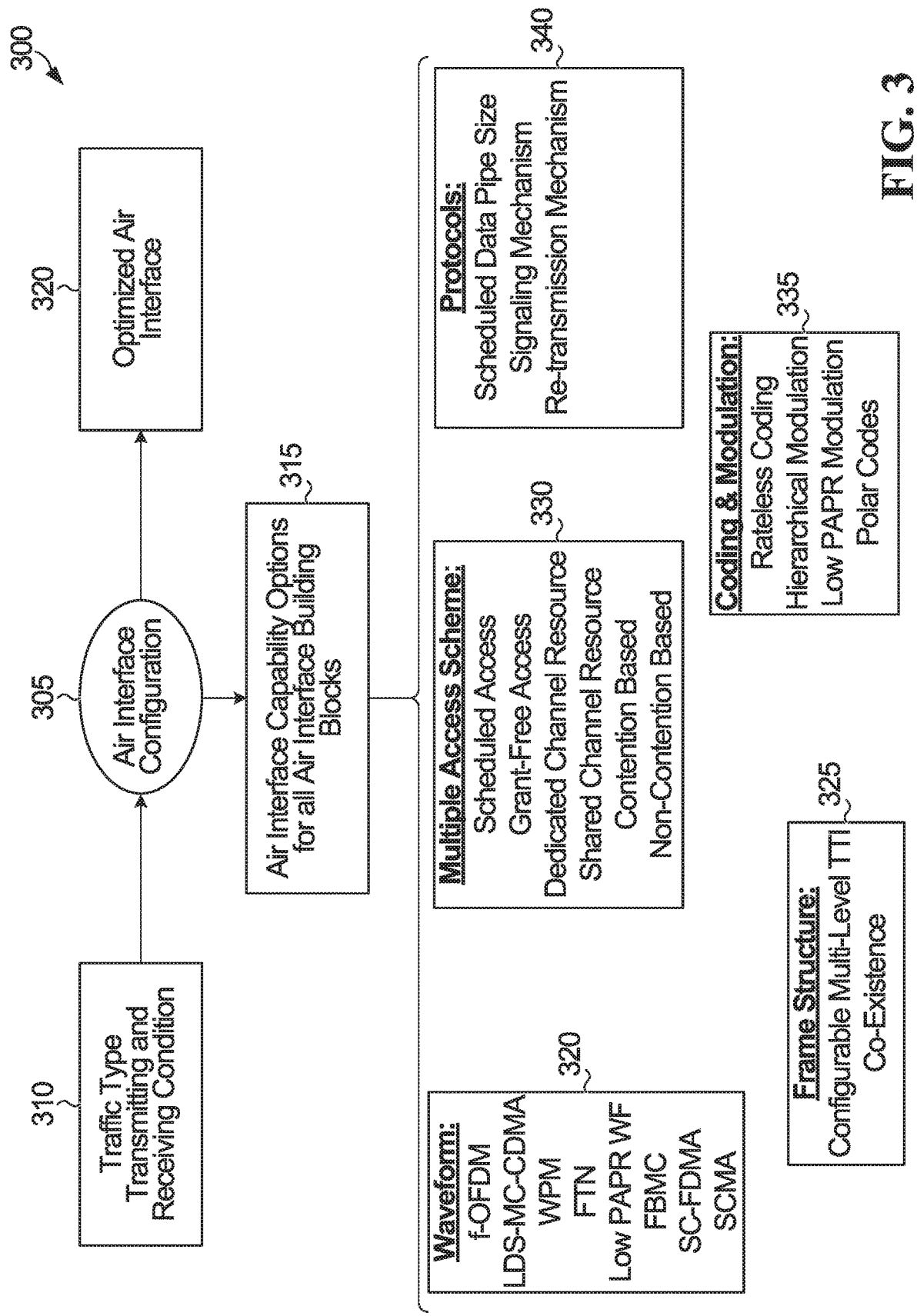
FIG. 3 illustrates a high level view of an example software configurable air interface concept according to example embodiments described herein.

FIG. 3 illustrates a high level view of an example software configurable air interface (SoftAI) concept 300, in which an Air Interface Configuration function 305 determines an Optimized Air Interface 320 to meet a different set of transmission requirements 310 by selecting air interface capability options from among the pool 315 of air interface capability options for all of the air interface building blocks.

In the illustrated example, the building blocks of the air interface include waveform building block 320, frame structure building block 325, multiple access scheme building block 330, coding and modulation building block 325 and protocols building block 340. Various potential air interface capability options are shown for each of the building blocks. Each building block of the optimized air interface 320 may have an air interface capability option selected out of a plurality of possible air interface capability options that is selected to meet transmission requirements 310, including transmission type, transmit condition, receive condition, and the like, for example. As an illustrative example, for waveform building block 320, possible options include f-OFDM, LDS-MC-CDMA, WPM, FTN, low PAPR WF, FBMC, SC-FDMA, SCMA, other variations of single carrier waveforms, and the like. It is noted that there may be multiple options associated within a given waveform type. For example, a device may support multiple different configurations of the f-OFDM waveform type, where each configuration has its own set of associated waveform parameters for the f-OFDM waveform type. For each building block, one of the possible air interface capability options is selected to meet the transmission requirements. As another illustrative example, for coding and modulation building block 335, possible options include rateless codes, hierarchical modulation, low PAPR modulation, polar codes, and the like. Suitable options may be selected to meet transmission requirements 310.

However, different devices may differ in the air interface capability options that they support in one or more of the building blocks. For example, a first device, such as a UE, may support multiple waveform options associated with waveform building block 320, while a second device, such as a sensor, may only support a single air interface capability option associated with waveform building block 320. In other words, some devices may support different levels of air interface configurability. Therefore, in order to be able to determine potential air interface configuration options that are supported by a given device, it would be advantageous to be aware of the air interface capabilities of the device, so that the candidates can be limited to only those air interface configuration options that the device is capable of supporting.

Aspects of the present disclosure provide mechanisms for an air interface capability exchange, by which a device signals its air interface capabilities to facilitate SoftAI optimization.

According to a first aspect of the present disclosure, a plurality of air interface configuration capability types are defined, with each air interface configuration capability type corresponding to support for a different level of configurability of the air interface.

In one embodiment, there may be only two different air interface configuration capability types to indicate whether or not a device supports multiple air interface configurations of the air interface. For example, first and second air interface configuration capability types may be defined, with the first type corresponding to support for only a predefined air interface configuration, and the second type corresponding to support for multiple air interface configuration options. Table 1 below is an example of a table of air interface configuration capability types in accordance with such an embodiment, where the first air interface configuration capability type is referred to as AI Type 0 and the second air interface configuration capability type is referred to as AI Type 1.

TABLE 1

| AI Configuration Capability Type | Parameter |
|---|---|
| AI Type 0 | Not configurable |
| AI Type 1 | Configurable |

In other embodiments, further or different air interface configuration capability types may be defined. For example, in some embodiments a plurality of predefined air interface configuration options may be defined and the second air interface configuration capability type corresponds to support for configurability of only a subset of the predefined air interface configuration options, whereas a third air interface configuration capability type may be defined that corresponds to support for configurability of all of the predefined air interface configuration options. For example, the second air interface configuration capability type may correspond to support for configurability within only a subset of the building blocks of the air interface, and the third air interface configuration capability type may correspond to support for configurability within each of the building blocks of the air interface. Table 2 below is an example of a table of air interface configuration capability types in accordance with such an embodiment, where the first air interface configuration capability type is referred to as AI Type 0, the second air interface configuration capability type is referred to as AI Type 1, and the third air interface configuration capability type is referred to as AI Type 2.

TABLE 2

| AI Configuration Capability Type | Parameter |
|---|---|
| AI Type 0 | Not configurable |
| AI Type 1 | Some Configurability |
| AI Type 2 | Full Configurability |

Many communication devices for so-called "vertical" applications, such as embedded sensor devices configured for machine type communication (MTC), may have non-configurable air interfaces that only support a predefined air interface configuration, and thus would be categorized as the first air interface configuration capability type.

For communication devices of the first type (e.g., AI Type 0), the information about the predefined air interface configuration that they support may either be implied by their air interface configuration capability type (i.e., the first air interface configuration capability type may be associated with a specific predefined air interface configuration) or in addition to signaling their air interface configuration capability type they may further signal information identifying the predefined air interface configuration that they support.

For communication devices of the other types (e.g., AI Type 1 and/or AI Type 2), in addition to signaling their air interface configuration capability type they may also transmit information to inform the network about air interface configuration options that they support. For example, such devices may signal information to inform the network about air interface capability options that they support for each of the building blocks of the air interface. However, in some cases where a communication device has full configurability, and is categorized as the third type, (e.g., AI Type 2), it may not be necessary to further signal to the network the specific air interface configuration options that are supported by the device, because the third air interface configuration capability type is understood to indicate that the device supports all available air interface configuration options. This functionality may be conditional on the UE and the network being synchronized in terms of what air interface configuration options are available.

There are many possible ways that a communication device may inform the network about its air interface configuration capability type. Some non-limiting examples are discussed below.

The 3$^{rd}$ Generation Partnership Project (3GPP) specification for Long Term Evolution (LTE) includes a UE category parameter, where higher data rate devices are designated with a higher category. This category parameter is signaled to the network by a device as part of a UE capability list in order to inform the network of the data rate capabilities/requirements of the device.

In one embodiment, a new parameter identifying a device's air interface configuration capability type may be similarly signaled to the network as part of the UE capability list along with the UE category in order to advise the network of the device's air interface configuration capability type. An example format of a UE capability list in accordance with such an embodiment is provided below, where the "ue-Category" field indicates the UE's category and the "ue-AirInterfaceConfigType" field indicates the UE's air interface configuration capability type:

```
UE-5G-Capability ::= SEQUENCE {
    ...
    ue-Category
    ue-AirInterfaceConfigType
    ...
}
```

In this embodiment, the device's UE category and air interface configuration capability type are independently configured. This can allow a higher UE category device, such as a machine for video surveillance that has a high data rate requirement, to indicate that it can only support a predefined air interface configuration, e.g., that it is an AI Type 0 device.

In another embodiment, the air interface configuration capability type is associated with the UE category. For example, an extra field may be added to the list of parameters associated with each UE category to indicate the air interface configuration capability type associated with each UE category. An example UE category table in accordance with this embodiment is shown below in Table 3. It is noted that, Table 3 is based Table 4.1A-1 in 3GPP TS 36.306 specification with an extra field added to indicate the air interface configuration capability type associated with each UE category.

TABLE 3

| UE DL Category | Maximum number of DL-SCH transport block bits received within a TTI | Maximum number of bits of a DL-SCH transport block received within a TTI | Total number of soft channel bits | Maximum number of supported layers for spatial multiplexing in DL | AI config type |
|---|---|---|---|---|---|
| DL Category 0 | 1000 | 1000 | 25344 | 1 | 0 |
| DL Category 6 | 301504 | 149776 (4 layers, 64QAM) 75376 (2 layers, 64QAM) | 3654144 | 2 or 4 | 1 |
| DL Category 7 | 301504 | 149776 (4 layers, 64QAM) 75376 (2 layers, 64QAM) | 3654114 | 2 or 4 | 1 |
| DL Category 9 | 452256 | 149776 (4 layers, 64QAM) 75376 (2 layers, 64QAM) | 5481216 | 2 or 4 | 1 |
| DL Category 10 | 452256 | 149776 (4 layers, 64QAM) 75376 (2 layers, 64QAM) | 5481216 | 2 or 4 | 1 |
| DL Category 11 | 603008 | 149776 (4 layers, 64QAM) 195816 (4 layers, 256QAM) 7536 (2 layers, 64QAM) 97896 (2 layers, 256QAM) | 7308288 | 2 or 4 | 1 |

In this embodiment, the air interface configuration supported by a device can potentially be implicitly indicated (e.g., an indication of AI Type 0 for UE category 0 (MTC) may imply the predefined air interface configuration supported by the device is a specific MTC configuration). However, one potential drawback of this embodiment is that each UE category can only support one air interface configuration capability type.

As noted earlier, in some cases in addition to signaling its air interface configuration capability type, a device may also transmit information regarding the air interface configuration options that it supports. For example, in some embodiments, the network may maintain an air interface building block table with indices for the potential air interface capability options within each building block and a device may indicate the air interface configuration options that it supports by referencing the corresponding indices in the air interface building block table.

An example of such an air interface building block table is shown below in Table 4, where the different indices in each building block represent different air interface capability options in a given building block, e.g., the WF_1, WF_2 and WF_3 indices represent different wave form air interface capability options (e.g., f-OFDM, SC-FDMA, LDS-MC-CDMA, WPM, FBMC, etc., and associated waveform parameters of the waveform), the MA_1 and MA_2 indices represent different multiple access scheme air interface capability options (e.g., dedicated channel resource, contention based, grant-free, etc.), and so on for each of the other building blocks. With respect to the waveform building block, it is noted that the air interface capability options for the waveform building block may include options for the same waveform type but with different associated waveform parameters. For example, the waveform indices WF_1 and WF_2 may both correspond to an OFDM based waveform, such as f-OFDM, but differ in terms of associated waveform parameters, such as sub-carrier spacing and/or cyclic prefix overhead.

TABLE 4

| Waveform | Multiple Access | Frame Structure | Protocol | Modulation and Coding |
|---|---|---|---|---|
| WF_1 | MA_1 | FS_1 | P_1 | MCS_1 |
| WF_2 | MA_2 | FS_2 | P_2 | MCS_2 |
| WF_3 |  | FS_3 |  |  |

A portion of an example of a table that may be used to inform the network about the air interface capability options that are supported by a given device for the waveform, frame structure, multiple access scheme, protocol, and coding and modulation building blocks is shown below in Table 5. As discussed above, in this example the air interface capability options are referenced using their corresponding indices in the exemplary air interface building block table shown in Table 4. The information conveyed in Table 5 may be transmitted by a device in order to inform the network of the air interface configuration options that it supports. This form of table or something similar may be stored in the network to keep a record of the AI capabilities of the device. In another embodiment, the information conveyed in Table 6, namely the air interface profile indices corresponding to respective air interface profiles may be transmitted by a device in order to inform the network of the air interface profiles that it supports.

TABLE 5

| UE AI Capability | Parameters |
|---|---|
| supportedWaveform | WF_1, WF_2 |
| supportedFrameStructureConfig | FS_2, FS_3 |
| supportedMultipleAccessScheme | MA_1, MA_3 |
| supportedProtocols | P_1, P_2, P_3 |
| supportedModulationAndCoding | MCS_1, MCS_2 |

TABLE 6

|  | AI Configuration/ Profile 1 | AI Configuration/ Profile 2 | AI Configuration/ Profile 3 |
|---|---|---|---|
| Waveform | WF_1 | WF_2 | WF_1 |
| Frame Structure | FS_2 | FS_1 | FS_1 |
| Multiple Access | MA_1 | MA_1 | MA_1 |
| Protocol | P_1 | P_2 | P_1 |
| Modulation and Coding | MCS_2 | MCS_1 | MCS_1 |

Figure 4A:
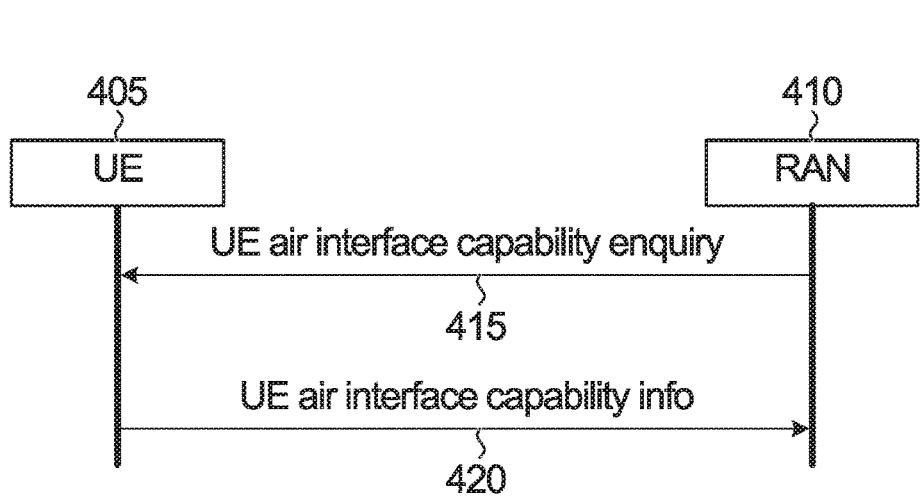
FIGS. 4A to 4C illustrate examples of air interface capability exchange procedures according to example embodiments described herein.
Figure 4B:
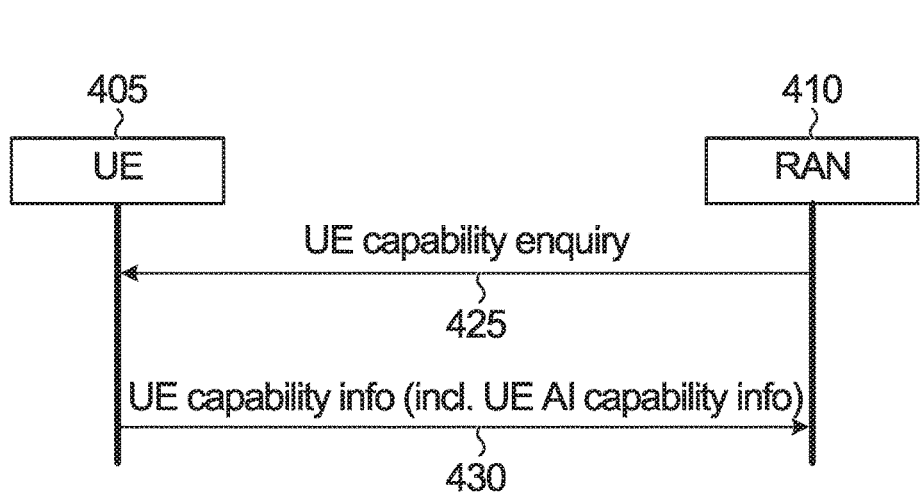
Figure 4C:
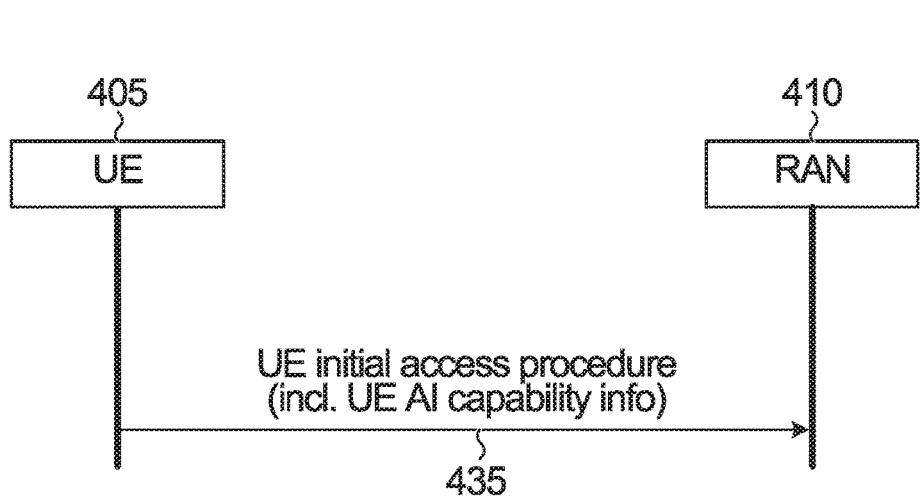

FIGS. 4A to 4C illustrate three examples of air interface capability exchange procedures in which a UE device 405 informs a Radio Access Network (RAN) device 410 of its air interface configuration capabilities according to example embodiments described herein.

FIG. 4A illustrates an example of a standalone air interface capability exchange procedure 400A. In this example, the RAN device 410 transmits a UE air interface capability inquiry 415 to UE 405 requesting the UE to identify its air interface configuration capabilities. Responsive to inquiry 415, UE 405 transmits a message 420 to RAN 410 containing information regarding its air interface configuration capabilities.

FIG. 4B illustrates an example air interface capability exchange procedure 400B that is part of a more general UE capability exchange procedure. In this example, the RAN device 410 transmits a UE capability inquiry 425 to UE 405 requesting the UE to identify its capabilities. Responsive to inquiry 425, UE 405 transmits a message 430 to RAN 410 containing information regarding its capabilities, including its air interface configuration capabilities.

FIG. 4C illustrates an example air interface capability exchange procedure 400C that occurs as part of an initial network access procedure. In this example, UE 405 transmits a message 435 to RAN device 410 as part of its initial access procedure to access the RAN, and the message 435 includes information regarding the UE's air interface configuration capabilities.

In some embodiments, the messages 420, 430 and 435 transmitted by UE 405 may include references to indices in an air interface building block table in order to advise RAN 410 of the air interface capability options that UE 405 supports for each of the building blocks of its air interface.

In some embodiments, the air interface capability exchange procedure occurs in the Radio Resource Control (RRC) layer.

Figure 5:
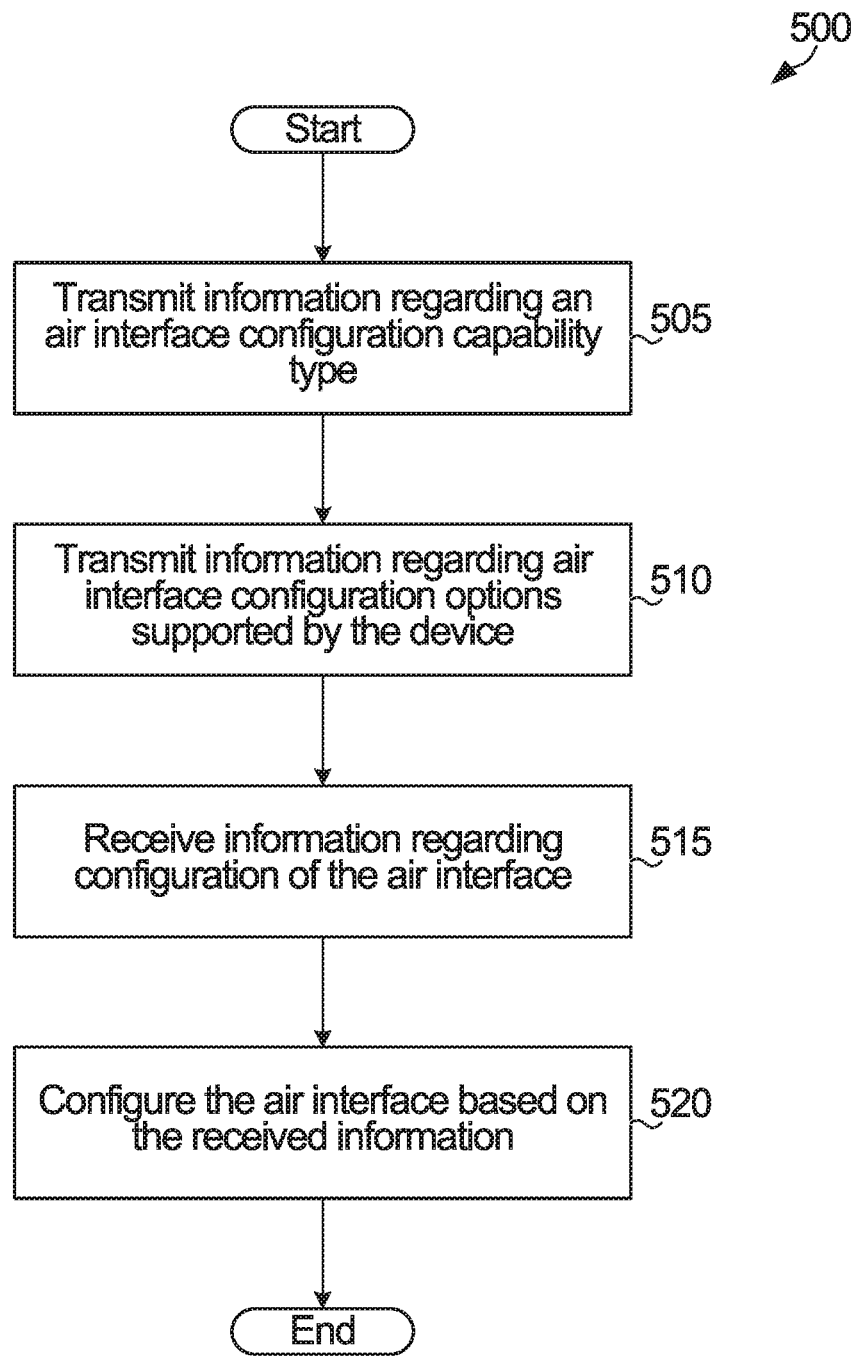
FIG. 5 illustrates a flow diagram of example operations in a first communication device according to example embodiments described herein.

FIG. 5 illustrates a flow diagram of example operations 500 in a first communication device according to example embodiments described herein. Operations 500 may be indicative of operations occurring in a UE device, such as UE 120, sensor 122, PC 126, tablet 128 and the like.

Operations 500 may begin with the device transmitting information regarding an air interface configuration capability type of the device (block 505). The air interface configuration capability type may identify whether the device supports multiple air interface configurations of the air interface of the device. For example, the air interface configuration capability type may be one of a plurality of air interface configuration capability types, where each air interface configuration capability type corresponds to support for a different level of configurability of the air interface.

The device may transmit further information regarding air interface configuration options supported by the device (block 510). For example, in some embodiments this transmission may occur according to one of the example air interface capability exchange procedures illustrated in FIGS. 4A to 4C. The air interface may be characterized by a plurality of building blocks and the transmission in block 510 may include information regarding air interface capability options associated with the plurality of building blocks that characterize the air interface. The further information in block 510 may be in the form of indices for different air interface capability options as described in Table 5. In another embodiment, the information may be in the form of indices of air interface profiles as described in Table 6.

The device may receive information regarding configuration of its air interface (block 515). The configuration may have been determined based at least in part on the information transmitted at block 505 and/or block 510 regarding the air interface configuration capability type and the air interface configuration options supported by the device.

The device may configure its air interface based on the received information (block 520).

The example method 500 is illustrative of an example embodiment. In other embodiments, similar or different operations could be performed in a similar or different order and/or certain operations may be omitted. Various ways to perform the illustrated operations, as well as examples of other operations that may be performed, are described herein. Further variations may be or become apparent.

For example, in some cases the plurality of air interface configuration capability types includes a first air interface configuration capability type corresponding to support for only a predefined air interface configuration of the air interface. As such, in some cases, for devices of the first air interface configuration capability type, the operation at block 510 may be omitted if the first air interface configuration capability type is understood to correspond to a specific predefined air interface configuration, such as an MTC configuration.

Figure 6:
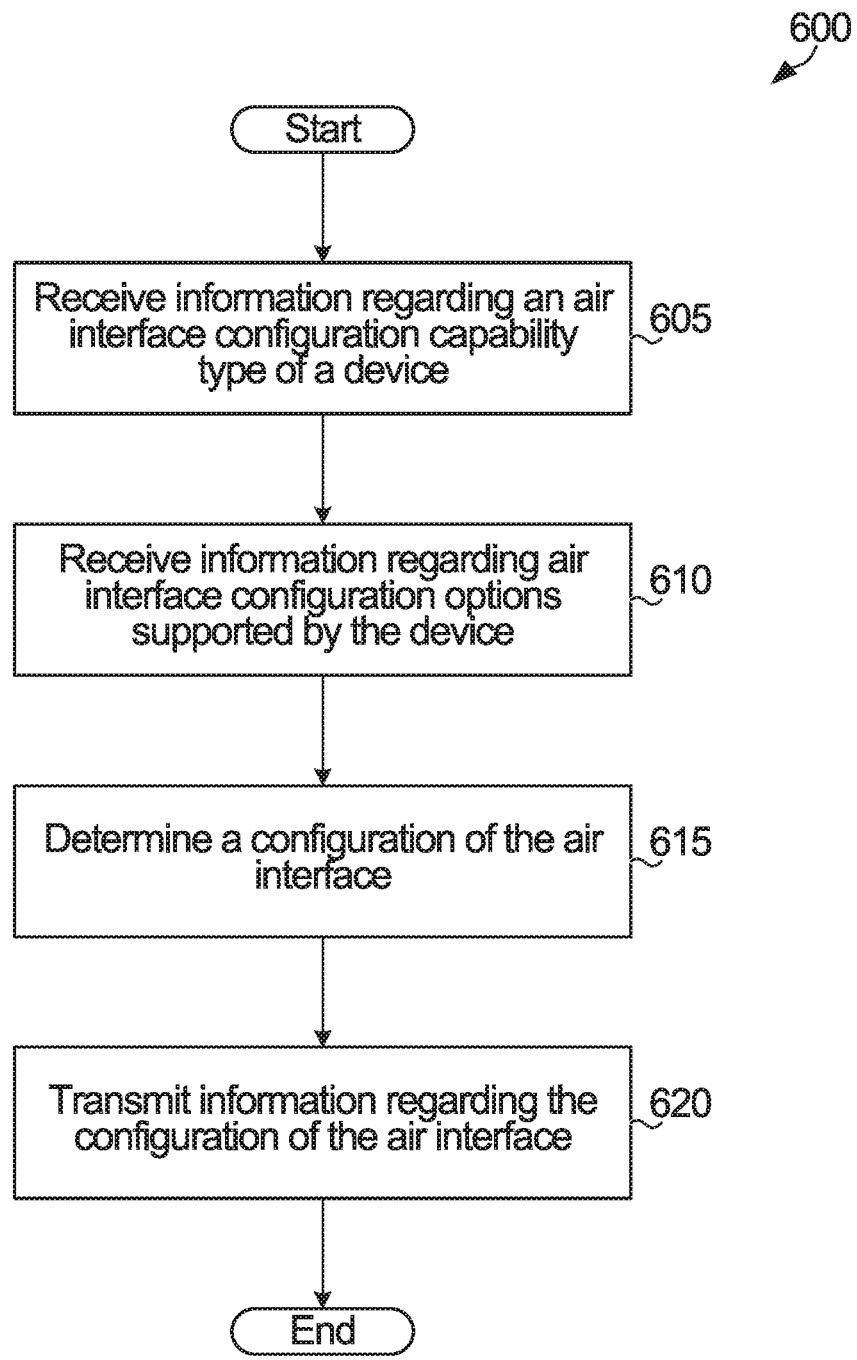
FIG. 6 illustrates a flow diagram of example operations in a second communication device according to example embodiments described herein.

FIG. 6 illustrates a flow diagram of example operations in a device according to example embodiments described herein. Operations 600 may be indicative of operations occurring in a network device such as eNB 105, picocell 117 and the like.

Operations 600 may begin with the device receiving information regarding an air interface configuration capability type of another device that supports an air interface (block 605). The other device may be a UE device, such as UE 120, sensor 122, PC 126, tablet 128 and the like. The air interface configuration capability type of the other device may identify whether the other device supports multiple air interface configurations of the air interface. For example, the air interface configuration capability type may be one of a plurality of air interface configuration capability types, where each air interface configuration capability type corresponds to support for a different level of configurability of the air interface.

The device may receive further information regarding air interface configuration options supported by the other device (block 610). For example, in some embodiments this information may be received in accordance with one of the example air capability exchange procedures illustrated in FIGS. 4A to 4C. In some cases, the air interface may be characterized by a plurality of building blocks and the transmission in block 610 may include information regarding air interface capability options associated with the plurality of building blocks that characterize the air interface. The further information received in block 610 may be in the form of indices for different air interface capability options as described in Table 5. In another embodiment, the information may be in the form of indices of air interface profiles as described in Table 6.

The device may determine a configuration of the air interface of the other device based at least in part on the information received at block 605 and/or block 610 regarding the air interface configuration capability type and the air interface configuration options supported by the other device (block 615). In some embodiments the determination may be further based on satisfying transmission requirements, including transmission content, transmit condition, receive condition, and the like, for transmitting to the other device. For example, the determination may be made in accordance with the SoftAI configuration concept illustrated in FIG. 3. In some embodiments, the determination in block 615 may involve the selection of an air interface profile from amongst one or more predefined air interface profiles supported by the other device.

The air interface configuration determined in block 615 may be transmitted to the other device (block 620). For example, in some embodiments the information transmitted to the other device in block 620 may be an indice associated with an air interface profile supported by the other device that was selected in block 615.

The example method 600 is illustrative of an example embodiment. In other embodiments, similar or different operations could be performed in a similar or different order and/or certain operations may be omitted. Various ways to perform the illustrated operations, as well as examples of other operations that may be performed, are described herein. Further variations may be or become apparent.

For example, in some cases the plurality of air interface configuration capability types includes a first air interface configuration capability type corresponding to support for only a predefined air interface configuration of the air interface. As such, in some cases, for devices of the first air interface configuration capability type, the operations at blocks 610 and/or 620 may be omitted if the first air interface configuration capability type is understood to correspond to a specific predefined air interface configuration, such as an MTC configuration.

Figure 7:
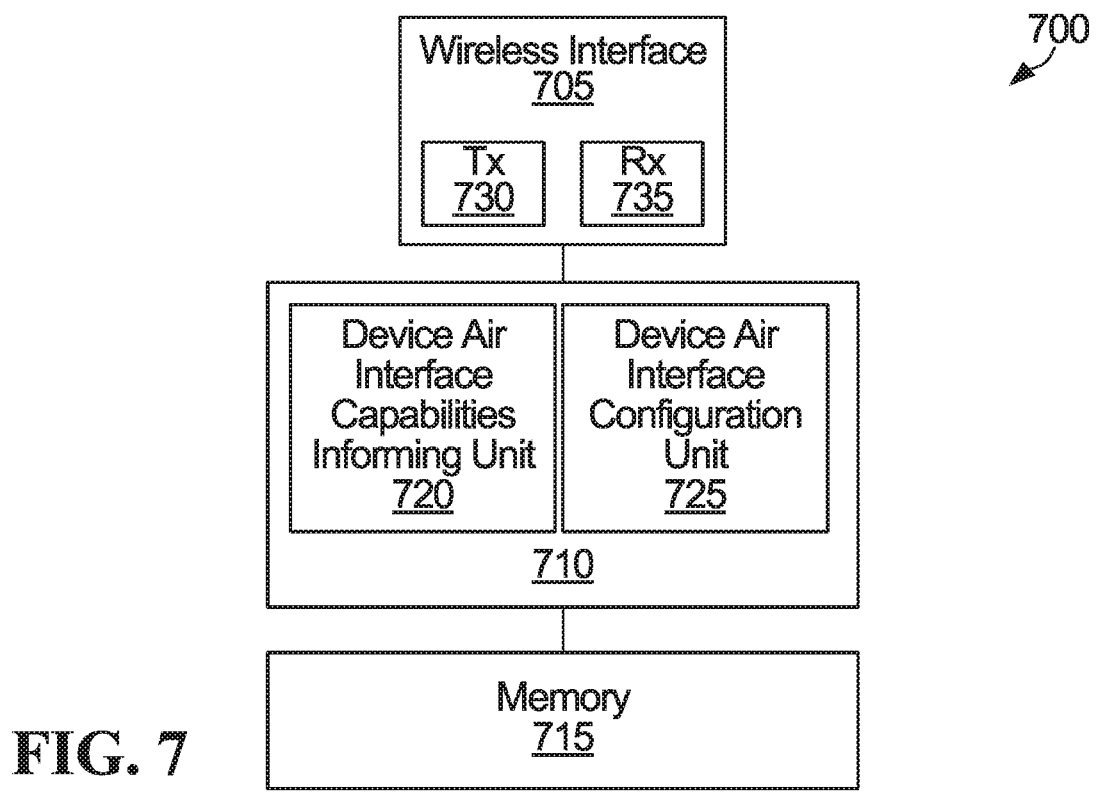
FIG. 7 illustrates a block diagram of an example first communication device according to example embodiments described herein.

FIG. 7 illustrates a block diagram of an example communication device 700 according to example embodiments described herein. Communication device 700 may be an implementation of a UE device, such as UE 120, sensor 122, PC 126, tablet 128 and the like. Communication device 700 may be used to implement various ones of the embodiments discussed herein.

As shown in FIG. 7, communication device 700 includes a wireless interface 705 that supports an air interface. Wireless interface 705 includes a transmitter 730 configured to send messages, and the like, and a receiver 735 configured to receive messages, and the like.

A device air interface capabilities informing unit 720 is configured to transmit, via wireless interface 705, information regarding an air interface configuration capability type of the device.

In some embodiments, the air interface configuration capability type identifies whether the device supports multiple air interface configurations of the air interface. For example, the air interface configuration capability type may be one of a plurality of air interface configuration capability types, each air interface configuration capability type corresponding to support for a different level of configurability of the air interface.

In some embodiments, device air interface capabilities informing unit 720 is further configured to transmit, via wireless interface 705, further information regarding air interface configuration options supported by the device's air interface. For example, the device's air interface may be characterized by a plurality of building blocks, and device air interface capabilities informing unit 720 may be configured to transmit further information regarding air interface capability options associated with the plurality of building blocks.

In some embodiment, device air interface capabilities informing unit 720 is configured to transmit the information regarding the air interface configuration capability type of the device and/or the air interface configuration options supported by the device in response to receiving an inquiry and/or as part of an initial network access procedure. For example, device air interface capabilities informing unit 720 may be configured to perform the actions of the UE device 405 according to one or more of the air interface capability exchange procedures illustrated in FIGS. 4A to 4C.

A device air interface configuration unit 725 is configured to receive, via wireless interface 705, information regarding configuration of the device's air interface. The configuration may have been determined based at least in part on the information transmitted by device air interface capabilities informing unit 720. Device air interface configuration unit 725 may be further configured to configure the device's air interface based on the received information.

A memory 715 is configured to store information regarding the device's air interface configuration capabilities, detected signals, decoded signals, and the like.

The elements of communication device 700 may be implemented as specific hardware logic blocks. In an alternative, the elements of communication device 700 may be implemented as software executing in a processor, controller, application specific integrated circuit, or so on. In yet another alternative, the elements of communication device 700 may be implemented as a combination of software and/or hardware.

As an example, transmitter 730 and receiver 735 may be implemented as a specific hardware block, while device air interface capabilities informing unit 720 and device air interface configuration unit 725 may be software modules executing in a processor 710, such as a microprocessor, a digital signal processor, a custom circuit, or a custom compiled logic array of a field programmable logic array. Device air interface capabilities informing unit 720 and device air interface configuration unit 725 may be modules stored in memory 715.

Figure 8:
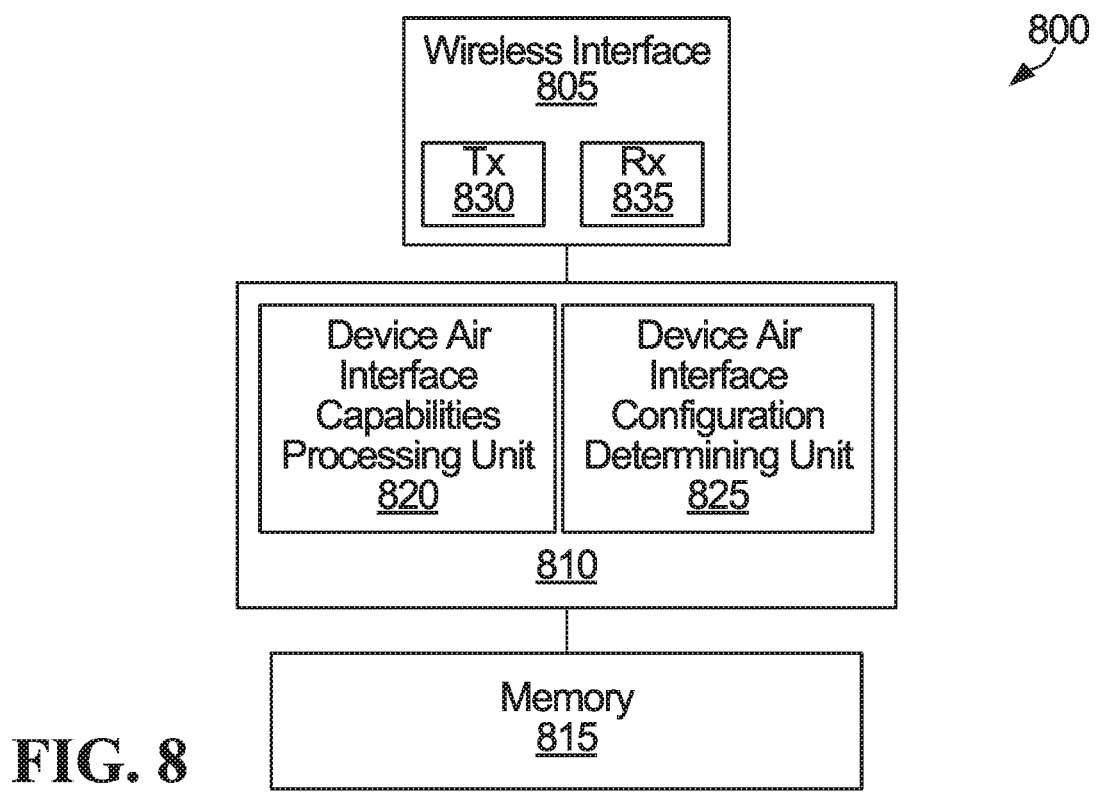
FIG. 8 illustrates a block diagram of another example second communication device according to example embodiments described herein.

FIG. 8 illustrates a block diagram of an example communication device 800 according to example embodiments described herein. Communication device 800 may be an implementation of a network device, such as eNB 105, picocell 117 and the like. Communication device 800 may be used to implement various ones of the embodiments discussed herein.

As shown in FIG. 8, communication device 800 includes a wireless interface 805. Wireless interface 805 includes a transmitter 830 configured to send messages, and the like, and a receiver 835 configured to receive messages, and the like.

A device air interface capabilities processing unit 820 is configured to receive, via wireless interface 805, information regarding an air interface configuration capability type of another device that supports an air interface. The other device may be a UE device, such as UE 120, sensor 122, PC 126, tablet 128 and the like. The air interface configuration capability type may identify whether the other device supports multiple air interface configurations of the air interface. For example, the air interface configuration capability type may be one of a plurality of air interface configuration capability types, each air interface configuration capability type corresponding to support for a different level of configurability of the air interface.

In some embodiments, device air interface capabilities processing unit 820 is further configured to receive, via wireless interface 805, further information regarding air interface configuration options supported by the other device. For example, the air interface may be characterized by a plurality of building blocks, and device air interface capabilities processing unit 820 may be configured to receive further information regarding air interface capability options associated with the plurality of building blocks.

In some embodiment, device air interface capabilities processing unit 820 is configured to transmit an inquiry, via wireless interface 805, to request the information regarding the air interface configuration capability type of the other device and/or the air interface configuration options supported by the other device. In some cases, device air interface capabilities processing unit 820 may be configured to receive the information as part of an initial network access procedure. For example, device air interface capabilities processing unit 820 may be configured to perform the actions of the RAN device 410 according to one or more of the air interface capability exchange procedures illustrated in FIGS. 4A to 4C.

A device air interface configuration determining unit 825 is configured to determine a configuration for the other device's air interface. The configuration may be based at least in part on the information received by device air interface capabilities processing unit 820 regarding the air interface configuration capability type and/or the air interface configuration options supported by the other device. The configuration may be further based on satisfying transmission requirements, including transmission content, transmit condition, receive condition, and the like, for transmitting to the other device. For example, the determination may be made in accordance with the SoftAI configuration concept illustrated in FIG. 3.

Device air interface configuration determining unit 825 may also be configured to transmit, via wireless interface 805, information regarding the configuration of the other device's air interface.

A memory 815 is configured to store information regarding the other device's air interface configuration capabilities, building block air interface capability options, selected air interface capability options of building blocks, transmission requirements, and the like.

The elements of communication device 800 may be implemented as specific hardware logic blocks. In an alternative, the elements of communication device 800 may be implemented as software executing in a processor, controller, application specific integrated circuit, or so on. In yet another alternative, the elements of communication device 800 may be implemented as a combination of software and/or hardware.

As an example, transmitter 830 and receiver 835 may be implemented as a specific hardware block, while device air interface capabilities processing unit 820 and device air interface configuration determining unit 825 may be software modules executing in a processor 810, such as a microprocessor, a digital signal processor, a custom circuit, or a custom compiled logic array of a field programmable logic array. Device air interface capabilities processing unit 820 and device air interface configuration determining unit 825 may be modules stored in memory 815.

Numerous modifications and variations of the present application are possible in light of the above teachings. It is therefore to be understood that within the scope of the appended claims, the application may be practised otherwise than as specifically described herein.

In addition, although described primarily in the context of methods, device and equipment, other implementations are also contemplated, such as in the form of instructions stored on a non-transitory computer-readable medium, for example.

We claim:

1. A method comprising:
    transmitting, by a user equipment (UE) device that supports an air interface, first information regarding an air interface configuration capability type of the UE device, the air interface configuration capability type identifying whether the UE device supports multiple air interface profiles, wherein the air interface configuration capability type of the UE device is one of a plurality of air interface configuration capability types, each air interface configuration capability type corresponding to support for a different level of configurability of the air interface; and
    transmitting, by the UE device, second information distinct from the first information, the second information indicating at least one predefined air interface profile supported by the UE device, each predefined air interface profile defining a respective set of configurations for a plurality of air interface components,
    wherein the plurality of air interface configuration capability types comprises:
    a first air interface configuration capability type corresponding to support for only a predefined air interface profile;
    a second air interface configuration capability type corresponding to support for multiple air interface profiles.

2. The method of claim 1, wherein the plurality of air interface components comprises at least:
    a waveform component, a frame structure component, a multiple access scheme component, a protocol component, and a modulation and coding scheme (MCS) component.

3. The method of claim 2, wherein a waveform component comprises at least one of Orthogonal Frequency Division Multiplexing (OFDM) based waveform, filtered OFDM (f-OFDM), Low Density Signature Multicarrier Code Division Multiple Access (LDS-MC-CDMA), Wavelet Packet Modulation (WPM), Faster Than Nyquist (FTN) Waveform, low Peak to Average Ratio Waveform (low PAPR WF), Filter Bank Multicarrier (FBMC) Waveform, Single Carrier Frequency Division Multiple Access (SC-FDMA), Sparse Code Multiple Access (SCMA), sub-carrier spacings and cyclic prefix (CP) overhead.

4. The method of claim 2, wherein a frame structure component comprises at least one of a multi-level transmission time interval (TTI), a fixed TTI, a configurable TTI, a co-existence configuration and the length of a TTI.

5. The method of claim 2, wherein a multiple access scheme component comprises at least one of scheduled access, grant-free access, dedicated channel resource (no sharing between multiple users), contention based shared channel resource, non-contention based shared channel resource and cognitive radio based access.

6. The method of claim 2, wherein a protocol component comprises at least one of a scheduled data pipe size, a signaling mechanism for transmission and/or re-transmission and a re-transmission mechanism.

7. The method of claim 2, wherein a MCS component comprises at least one of turbo trellis codes, turbo product codes, fountain codes, hierarchical modulation, low PAPR modulation and polar codes.

8. The method of claim 1, wherein transmitting second information indicating at least one predefined air interface profile supported by the UE device comprises transmitting at least one air interface profile indice, where each air interface profile indice corresponds to a respective predefined air interface configuration option.

9. The method of claim 1, wherein transmitting first information regarding the air interface configuration capability type of the UE device comprises transmitting an air interface configuration capability type indice, where each air interface configuration capability type indice corresponds to a respective air interface configuration capability type.

10. The method of claim 1, further comprising:
    receiving, by the UE device, information regarding a configuration of the air interface, the configuration of the air interface comprising a set of configurations for the plurality of air interface components; and
    configuring, by the UE device, the air interface of the UE device based on the received information regarding the configuration of the air interface, the configuration based at least in part on the transmitted first information regarding the air interface configuration capability type of the UE device.

11. The method of claim 10, wherein the information regarding the configuration of the air interface of the UE device comprises an air interface profile indice corresponding to an air interface profile that includes a predefined air interface configuration option.

12. The method of claim 1, wherein transmitting the first information and the second information comprises at least one of:
    transmitting the first information and the second information in response to receiving an inquiry; and
    transmitting the first information and the second information as part of an initial network access procedure.

13. The method of claim 1, wherein:
    the second air interface configuration capability type corresponds to support for configurability of a partial subset of the air interface components of the plurality of air interface components; and
    the plurality of air interface configuration capability types further comprises a third air interface configuration capability type corresponding to support for configurability of all of the air interface components of the plurality of air interface components.

14. A User Equipment (UE) device comprising:
    a wireless interface that supports an air interface for the UE device;
    a processor operatively coupled to the wireless interface; and
    a computer readable storage medium operatively coupled to the processor, the computer readable storage medium storing programming for execution by the processor, the programming comprising instructions to:
    transmit, via the wireless interface, first information regarding an air interface configuration capability type of the UE device, the air interface configuration capability type identifying whether the UE device supports multiple air interface profiles, wherein the air interface configuration capability type of the UE device is one of a plurality of air interface configuration capability types, each air interface configuration capability type corresponding to support for a different level of configurability of the air interface; and
    transmit, via the wireless interface, second information distinct from the first information, the second information indicating at least one predefined air interface profile supported by the UE device, each predefined air interface profile defining a respective set of configurations for a plurality of air interface components,
    wherein the plurality of air interface configuration capability types comprises:

a first air interface configuration capability type corresponding to support for only a predefined air interface profile;
a second air interface configuration capability type corresponding to support for multiple air interface profiles.

15. The device of claim 14, wherein the plurality of air interface components comprises at least:
   a waveform component, a frame structure component, a multiple access scheme component, a protocol component, and a modulation and coding scheme (MCS) component.

16. The device of claim 14, wherein the second information indicating at least one predefined air interface profile supported by the UE device comprises at least one air interface profile indice, where each air interface profile indice corresponds to a respective predefined air interface configuration option.

17. The device of claim 14, wherein the first information regarding the air interface configuration capability type of the UE device comprises an air interface configuration capability type indice, where each air interface configuration capability type indice corresponds to a respective air interface configuration capability type.

18. The device of claim 14, wherein the programming further comprises instructions to:
   receive, via the wireless interface, information regarding a configuration of the air interface, the configuration of the air interface comprising a set of configurations for the plurality of air interface components; and
   configure the air interface of the UE device based on the received information regarding the configuration of the air interface, the configuration based at least in part on the transmitted first information regarding the air interface configuration capability type of the UE device.

19. The device of claim 18, wherein the information regarding configuration of the air interface of the UE device comprises an air interface profile indice corresponding to an air interface profile that includes a predefined air interface configuration option.

20. The device of claim 14, wherein the instructions to transmit the first information and the second information comprise at least one of:
   instructions to transmit the first information and the second information in response to receiving an inquiry; and
   instructions to transmit the first information and the second information as part of an initial network access procedure.

21. The device of claim 14, wherein the air interface configuration capability type corresponds to support for configurability of all predefined air interface profiles.

22. A method comprising:
   receiving first information regarding an air interface configuration capability type of a User Equipment (UE) device that supports an air interface, the air interface configuration capability type identifying whether the UE device supports multiple air interface profiles, wherein the air interface configuration capability type of the UE device is one of a plurality of air interface configuration capability types, each air interface configuration capability type corresponding to support for a different level of configurability of the air interface;
   receiving second information distinct from the first information, the second information indicating at least one predefined air interface profile supported by the UE device, each predefined air interface profile defining a respective set of configurations for a plurality of air interface components; and
   determining a configuration of the air interface of the UE device based at least in part on the first information and the second information, the configuration of the air interface comprising a set of configurations for the plurality of air interface components,
   wherein the plurality of air interface configuration capability types comprises:
   a first air interface configuration capability type corresponding to support for only a predefined air interface profile;
   a second air interface configuration capability type corresponding to support for multiple air interface profiles.

23. The method of claim 22, wherein the plurality of air interface components comprises at least:
   a waveform component, a frame structure component, a multiple access scheme component, a protocol component, and a modulation and coding scheme (MCS) component.

24. The method of claim 22, wherein the second information indicating at least one predefined air interface profile supported by the UE device comprises at least one air interface profile indice, where each air interface profile indice corresponds to a respective predefined air interface configuration option.

25. The method of claim 22, wherein the first information regarding the air interface configuration capability type of the UE device comprises an air interface configuration capability type indice, where each air interface configuration capability type indice corresponds to a respective air interface configuration capability type.

26. The method of claim 22, wherein receiving the first information and the second information comprises at least one of:
   a) transmitting an inquiry to the UE device and receiving the first information and the second information in a response to the inquiry; and
   b) receiving the first information and the second information as part of an initial network access procedure by the UE device.

27. The method of claim 22, further comprising:
   transmitting, to the UE device, information regarding the configuration of the air interface of the UE device.

28. An apparatus comprising:
   a processor; and
   a computer readable storage medium operatively coupled to the processor, the computer readable storage medium storing programming for execution by the processor, the programming comprising instructions to:
   receive first information regarding an air interface configuration capability type of a User Equipment (UE) device that supports an air interface, the air interface configuration capability type identifying whether the UE device supports multiple air interface profiles, wherein the air interface configuration capability type of the UE device is one of a plurality of air interface configuration capability types, each air interface configuration capability type corresponding to support for a different level of configurability of the air interface;
   receive second information distinct from the first information, the second information indicating at least one predefined air interface profile supported by the UE device, each predefined air interface profile defining a respective set of configurations for a plurality of air interface components; and determine a configuration of the air interface of the UE device based at least in part on the first information and the second information, the configuration of the air interface comprising a set of configurations for the plurality of air interface components, wherein the plurality of air interface configuration capability types comprises:

a first air interface configuration capability type corresponding to support for only a predefined air interface profile;

a second air interface configuration capability type corresponding to support for multiple air interface profiles.

29. The apparatus of claim 28, wherein the plurality of air interface components comprises at least:

a waveform component, a frame structure component, a multiple access scheme component, a protocol component, and a modulation and coding scheme (MCS) component.

30. The apparatus of claim 28, wherein the second information indicating at least one predefined air interface profile supported by the UE device comprises at least one air interface profile indice, where each air interface profile indice corresponds to a respective predefined air interface configuration option.

31. The apparatus of claim 28, wherein the first information regarding the air interface configuration capability type of the UE device comprises an air interface configuration capability type indice, where each air interface configuration capability type indice corresponds to a respective air interface configuration capability type.

32. The apparatus of claim 28, wherein receiving the first information and the second information comprises at least one of:

a) transmitting an inquiry to the UE device and receiving the first information and the second information in a response to the inquiry; and b) receiving the first information and the second information as part of an initial network access procedure by the UE device.

33. The apparatus of claim 28, wherein the programming further comprises instructions to:

transmit, to the UE device, information regarding the configuration of the air interface of the UE device.

\* \* \* \* \*

UNITED STATES PATENT AND TRADEMARK OFFICE
CERTIFICATE OF CORRECTION

PATENT NO. : 10,728,743 B2  
APPLICATION NO. : 15/000611  
DATED : July 28, 2020  
INVENTOR(S) : Kelvin Kar Kin Au Page 1 of 2

It is certified that error appears in the above-identified patent and that said Letters Patent is hereby corrected as shown below:

In the Claims

At Column 18, Line 28, Claim 12:  
"...tion in response to receiving an inquiry; and"  
Should be:  
-- tion in response to receiving an enquiry; and --

At Column 19, Line 46, Claim 20:  
"second information in response to receiving an inquiry;"  
Should be:  
-- second information in response to receiving an enquiry; --

At Column 20, Line 40, Claim 26:  
"a) transmitting an inquiry to the UE device and receiving"  
Should be:  
-- a) transmitting an enquiry to the UE device and receiving --

At Column 20, Line 42, Claim 26:  
"response to the inquiry; and"  
Should be:  
-- response to the enquiry: and --

At Column 22, Line 13, Claim 32:  
"a) transmitting an inquiry to the UE device and receiving"  
Should be:  
-- a) transmitting an enquiry to the UE device and receiving --

At Column 22, Line 15, Claim 32:  
"response to the inquiry; and"

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*

Should be:
-- response to the enquiry; and --